US 8,452,889 B2

(12) United States Patent
Langille (10) Patent No.: US 8,452,889 B2
(45) Date of Patent: *May 28, 2013

(54) NETWORK PERFORMANCE ASSESSMENT APPARATUS, SYSTEMS, AND METHODS

(75) Inventor: Gary R. Langille, Greenwood Village, CO (US)

(73) Assignee: Echostar Technologies LLC, Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 13/523,517

(22) Filed: Jun. 14, 2012

(65) Prior Publication Data

US 2012/0254458 A1 Oct. 4, 2012

Related U.S. Application Data

(63) Continuation of application No. 11/778,287, filed on Jul. 16, 2007, now Pat. No. 8,224,982.

(51) Int. Cl.
*G06F 15/16* (2006.01)

(52) U.S. Cl.
USPC ........... 709/232; 709/223; 709/224; 709/225; 709/231; 709/247; 725/95; 725/120; 725/110; 725/114; 725/87

(58) Field of Classification Search
USPC .... 709/223–225, 231–232, 247, 228; 725/95, 725/120, 110, 114, 87
See application file for complete search history.

(56) References Cited

U.S. PATENT DOCUMENTS

| 3,416,043 | A | 12/1968 | Jorgensen |
| 5,850,482 | A | 12/1998 | Meany et al. |
| 5,852,437 | A | 12/1998 | Wugofski et al. |
| 5,968,132 | A | 10/1999 | Tokunaga et al. |
| 6,097,441 | A | 8/2000 | Allport |
| 6,263,503 | B1 | 7/2001 | Margulis |
| 6,553,147 | B2 | 4/2003 | Chai et al. |
| 6,839,767 | B1 | 1/2005 | Davies et al. |
| 7,016,337 | B1 | 3/2006 | Wu et al. |

(Continued)

FOREIGN PATENT DOCUMENTS

| WO | 03/026232 | 3/2003 |
| WO | 03/098897 | 11/2003 |
| WO | WO 03098897 A1 * | 11/2003 |

OTHER PUBLICATIONS

Ditze et al.; "Resource Adaption for Audio-Visual Devices the UPnP QoS Architecture"; Advanced Networking and Applications, 2006; AINA, 2006; 2OT H International Conference in Vienna, Austria Apr. 18-20, 2006.*

(Continued)

*Primary Examiner* — Wing F Chan
*Assistant Examiner* — Benjamin M Thieu
(74) *Attorney, Agent, or Firm* — Seed IP Law Group PLLC (57) ABSTRACT

Various embodiments of network performance assessment apparatus, systems and processes collect performance information pertaining to a current capacity utilization of a network, identify an occurrence of a capacity constraint on a portion of the network that is communicating the program to at least one presentation device, and modify at least one characteristic of the program and/or the communication thereof over the network so that a total capacity utilization of the network is less than a peak capacity of the network.

17 Claims, 6 Drawing Sheets

U.S. PATENT DOCUMENTS

| | | |
|---|---|---|
| 7,151,575 B1 | 12/2006 | Landry et al. |
| 7,505,480 B1 | 3/2009 | Zhang et al. |
| 2002/0053053 A1 | 5/2002 | Nagai et al. |
| 2002/0090029 A1 | 7/2002 | Kim |
| 2002/0131497 A1 | 9/2002 | Jang |
| 2003/0123840 A1 | 7/2003 | Fujinami |
| 2003/0159143 A1 | 8/2003 | Chan |
| 2003/0191856 A1 | 10/2003 | Lewis et al. |
| 2003/0192054 A1 | 10/2003 | Birks et al. |
| 2004/0162903 A1 | 8/2004 | Oh |
| 2004/0184410 A1 | 9/2004 | Park |
| 2005/0091696 A1 | 4/2005 | Wolfe et al. |
| 2005/0223087 A1 | 10/2005 | Van Der Stok |
| 2005/0251833 A1 | 11/2005 | Schedivy |
| 2005/0276284 A1 | 12/2005 | Krause et al. |
| 2006/0095471 A1 | 5/2006 | Krikorian et al. |
| 2006/0117371 A1 | 6/2006 | Margulis |
| 2006/0193295 A1 | 8/2006 | White et al. |
| 2007/0076604 A1* | 4/2007 | Litwack .................. 370/230 |
| 2007/0216759 A1 | 9/2007 | Gonen et al. |
| 2007/0226344 A1 | 9/2007 | Sparrell et al. |
| 2008/0285936 A1* | 11/2008 | Yampanis et al. ............ 386/46 |
| 2010/0014534 A1 | 1/2010 | Bennett |

OTHER PUBLICATIONS

European Search Report for corresponding European Patent Application No. 08172031.0, dated Sep. 24, 2012, 7 pages.

International Search Report for International Application No. PCT/US05/20105, mailed Feb. 15, 2007, 1 page.

International Search Report for PCT/US2008/069914, mailed Dec. 19, 2008, 3 pages.

Office Action for U.S. Appl. No. 11/147,664, mailed May 15, 2009, 41 pages.

"Replay TV5000 User's Guide," SONICblue Incorporated, 2002, 86 pages.

Lee et al., "Compressed High Definition Television (HDTV) over IPv6," 2006 International Symposium on Applications and the Internet Workshops (SAINT 2006 Workshops), Phoenix, AZ, USA, Jan. 23-27, pp. 22-25, 2006.

Lowekamp et al., "A Hierarchy of Network Performance Characteristics for Grid Applications and Service," GGF Network Measurements Working Group, pp. 1-29, May 24, 2004.

* cited by examiner

NETWORK CAPACITY

HIGH

MULTI HD STREAM WITH TRICK MODE SUPPORT
SINGLE HD STREAM WITH TRICK MODE SUPPORT
MULTI SD STREAM WITH TRICK MODE SUPPORT
MULTI HD STREAM, NO TRICK MODE SUPPORT
SINGLE SD STREAM WITH TRICK MODE SUPPORT
SINGLE HD STREAM, NO TRICK MODE SUPPORT
MULTI SD STREAM, NO TRICK MODE SUPPORT
SINGLE SD STREAM, NO TRICK MODE SUPPORT

LOW

NETWORK PERFORMANCE ASSESSMENT APPARATUS, SYSTEMS, AND METHODS

CROSS-REFERENCE TO RELATED APPLICATION

This application is a continuation of U.S. patent application Ser. No. 11/778,287, filed Jul. 16, 2007, now allowed, which application is incorporated herein by reference in its entirety.

TECHNICAL FIELD

The technical field relates to network performance assessment systems and methods for audio, video, and/or data content providers and, more particularly, to apparatus, systems and methods for communicating information over a network based on the performance of the network.

BRIEF SUMMARY

A system and method for communicating information over a network performance assessment system are disclosed. According to one embodiment, an apparatus comprises a receiver operable to receive a user selection of the program; a network formatter operable to format the selected program into information compatible with a communication format used by a network, and operable to transmit the formatted program onto the network; and a network performance assessor operable to assess performance of the network, operable to determine an occurrence of a capacity constraint on the network, and operable to cause the network formatter to modify the program communicated over the network to reduce capacity utilization on the network.

Another embodiment is a method comprising collecting performance information pertaining to a current capacity utilization of the network, identifying an occurrence of a capacity constraint on a portion of the network that is communicating the program to a presentation device, and modifying the program so that a total capacity utilization of the network is less than a peak capacity of the network.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
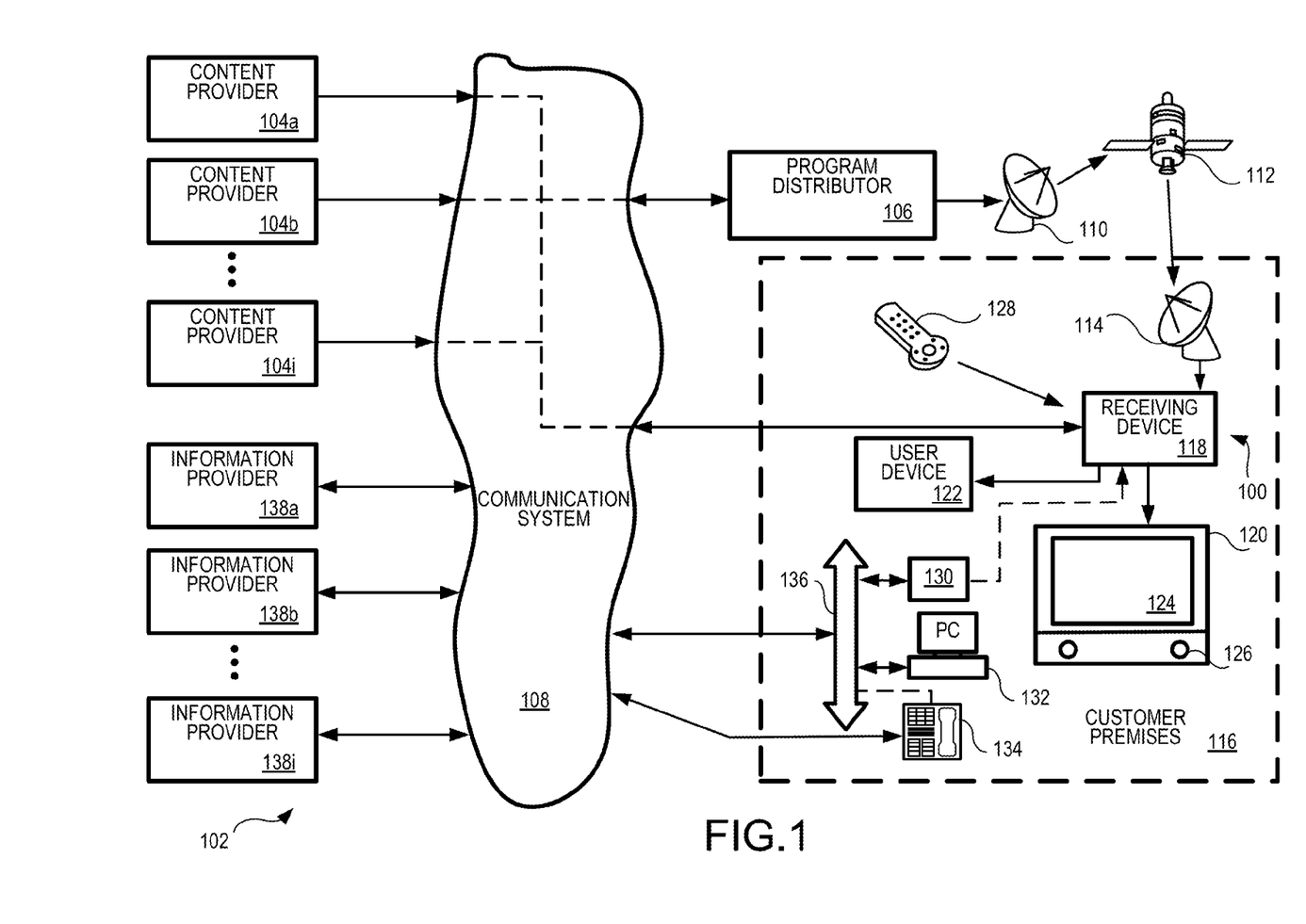
FIG. 1 is an overview block diagram illustrating an exemplary communication network.

FIG. 1 is an overview block diagram illustrating an exemplary communication network 102 in which an embodiment 100 of the network performance assessor 200 (FIG. 2) may be implemented. It is to be appreciated that FIG. 1 is just one example of a communications network and that the various embodiments discussed herein are not limited to such exemplary network. Communication network 102 can include a variety of communication systems and can use a variety of communication media including, but not limited to, satellite wireless media.

Television service providers provide their customers a multitude of audio/video and/or data programming (hereafter, collectively and/or exclusively "programming" or "program(s)"). Such programming is often provided by use of a receiving device 118 (FIG. 1) communicatively coupled to a presentation device 120 configured to receive the programming.

Receiving device 118 interconnects to a one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

Receiving device 118 may be interchangeably referred to as a "television converter," "receiver," "set-top box," "television receiving device," "television receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and other user devices 122.

Examples of a presentation device 120 include, but are not limited to, a television (TV), a personal computer (PC), a sound system receiver, a digital video recorder (DVR), a compact disk (CD) device, game system, or the like. Presentation devices 120 employ a display, one or more speakers, or other output devices to communicate video and/or audio content to a user. In many implementations, one or more presentation devices 120 reside in or near a customer's premises 116 and are communicatively coupled, directly or indirectly, to the receiving device 118.

Some customer premises 116 include a network 136, or a networked system, to which receiving devices 118, presentation devices 129, and/or a variety of user devices 122 can be coupled, collectively referred to as endpoint devices. Non-limiting examples of network 136 include, but are not limited to, an Ethernet, twisted pair Ethernet, an intranet, a local area network (LAN) system, or the like, One or more endpoint devices, such as PCs, data storage devices, TVs, game systems, sound system receivers, Internet connection devices, digital subscriber loop (DSL) devices, wireless LAN, WiFi, Worldwide Interoperability for Microwave Access (WiMax), or the like, are communicatively coupled to network 136 so that the plurality of endpoint devices are communicatively coupled together. Thus, the network 136 allows the interconnected endpoint devices, and the receiving device 118, to communicate with each other.

The network 136 will commonly have a limiting peak capacity that defines the maximum amount of information traffic that may be simultaneously transmitted over the network 136. The capacity of the network 136 is often defined by the components of the network 136 which have the lowest capacity. For example, physical constraints imposed by a coaxial cable (signal attenuation that is a function of cable length and cable impedance) may be a limiting component of a network 136. As another nonlimiting example, the switching speed of a switching device may be the limiting component of network 136.

So long as the total capacity utilization of network 136 is less than or equal to the peak capacity of network 136, operating endpoint devices will be able to communicate within their designed information transfer rates. The total utilization rate of network 136 corresponds to the total amount of information communicated by all endpoint devices concurrently communicating over the network 136. However, when the total utilization rate reaches the above-described peak capacity of the network 136, some or all of the endpoint devices will not be able to communicate at their designed information transfer rates. That is, information communication rates between endpoint devices may slow down, some of the communicated information (interchangeably referred to as data) may be lost or dropped, and/or some endpoint devices may cease to transmit/receive information altogether.

Often, the slow down of information transfer between endpoint devices is of no practical consequence to the user. For example, consider information communicated between two non-limiting exemplary endpoint devices, a PC and a data storage device. If information communication rates between the PC and the storage device decrease, the user may be indifferent if the storage of data requires a little more time than usual. If information is lost or dropped, inherent redundancy schemes may detect the lost or dropped information, and then retransmit the lost or dropped information so that all information is eventually communicated between the PC and the data storage device. So long as all information is accurately and reliably stored into and/or retrieved from the data storage device, the user may be indifferent if the storage and/or retrieval of data requires a little more time than usual.

Interconnecting one or more presentation devices 120 to a receiving device 118 via the network 136 is often desirable when the network 136 extends throughout the customer premises 116, and the receiving device 118 resides at a particular location within the customer premises 116 that is remote from the location of one or more presentation devices 120. For example, the receiving device 118 may be located where a cable connection enters a home, while one or more presentation devices 120 (e.g., a television) may be located remotely in various rooms of the home. With a network 136 residing in the home, there is no longer a need to install dedicated cables (e.g., coax, twisted pair or otherwise) throughout the home to provide direct connectivity between the receiving devices 118 and the presentation devices 120 or user devices 122. Nor is there a limitation that the presentation devices 120 or user devices 122 be inconveniently located in close proximity to the receiving device 118. Rather, interconnectivity is provided via the network 136.

When one or more presentation devices 120 are communicatively coupled to a receiving device 116 via a network 136, the user is able to view selected programming on a real-time basis so long as the capacity utilization (total amount of information traffic) over the network 136 is less than or equal to the peak capacity of the network 136. However, when capacity utilization attempts to exceed the capacity of the network 136, information transfer rates may decrease, and/or information (data) may be lost or dropped. For example, undesirable image pixilation may occur, or undesirable distortion of the images may become apparent to the viewer. Such situations are generally viewed as intolerable under current industry standards. That is, a viewer expects that they will be able to view a sharp, clear, and undistorted video image on their TV at all times.

Accordingly, the various embodiments disclosed herein, whether used singularly or in combination, facilitate the communication of programming received by one or more receiving devices 118 to one or more presentation devices 120 or user devices 122, via the network 136. Desirably, but not necessarily, the various embodiments change or modify at least one characteristic of the program, such as the communication of audio, video and/or data information, communicated to presentation devices 120 so that the audio and/or video information is presented at desired quality and/or quantity levels.

A. Communication Network Overview

A plurality of content providers 104a-104i provide program content to a distributor, such as the program distributor 106. Exemplary content providers 104a-104i can include, but are not limited to, television stations providing local or national television programming, special content providers providing premium based programming or pay-per-view programming, radio stations providing audio programming, interactive content providers or the like.

Program content, interchangeably referred to as a program, is communicated to the program distributor 106 from the content providers 104a-104i through suitable communication media, generally illustrated as communication system 108. Communication system 108 may include many different types of communication media, now known or later developed. Non-limiting media examples include telephony systems, the Internet, internets, cable networks, fiber optic networks, microwave networks, asynchronous transfer mode (ATM) systems, frame relay networks, digital subscriber loop (DSL) systems, radio frequency (RF) networks, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics network. As another nonlimiting example, an audio content provider may communicate audio content via its own satellite system to the program distributor 106.

The received program content is converted by one or more devices (not shown) as necessary at the program distributor 106 into a suitable signal that is communicated (i.e.; "uplinked") by one or more antennas 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antennae 114 are operable to receive signals from a single satellite 112. Other types of receiver antennae 114 are operable to receive signals from multiple satellites 112.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. Receiving device is a conversion device that converts, also refereed to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television (TV) or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk (CD) recorder, a digital versatile disc or digital video disc (DVD) recorder, a digital video recorder (DVR), or a personal video recorder (PVR). User device 122 may also include game devices, magnetic tape type recorders, RF transceivers, and personal computers (PCs).

Interface between the receiving device 118 and a user (not shown) may be provided by a hand-held remote device 128. Remote 128 typically communicates with the receiving device 118 using a suitable wireless medium, such as infrared (IR), RF, or the like. Other devices (not shown) may also be communicatively coupled to the receiving device 118 so as to provide user instructions. Non-limiting examples include game device controllers.

The receiving device 118 may receive content partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Some embodiments may employ an intermediary device 130 to communicatively couple the receiving device 118 to the network 136. Other embodiments are configured to directly couple to network 136, and are described in greater detail below.

It is appreciated that it is not practical to list or describe herein all of the possible types of receiving devices 118, presentation devices 120, user devices 122, remotes 128, intermediary devices 130, or their equivalents. Further, it is appreciated that it is not practical to list or describe herein all of the possible types of interconnectivity and/or forms of media by which a receiving device 118 may receive program content. However, all such possible devices, types of interconnectivity, and media forms are intended to be included within the scope of this disclosure. Examples of such devices, types of interconnectivity, and/or media forms are further described in greater detail hereinbelow.

Customer premises 116 may include other devices which are communicatively coupled to communication system 108 via a suitable media. For example, personal computer (PC) 132 may be communicatively coupled to the communication system 108 via the network 136. Alternatively, devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

The above description of the communication network 102, and the various devices therein, is intended as a broad, non-limiting overview of an exemplary environment in which various embodiments of the network performance assessor 200 (FIG. 2) may be implemented in. The communication network 102, and the various devices therein, may contain other devices, systems and/or media not specifically described herein.

B. Customer Premises Network Overview

Figure 2:
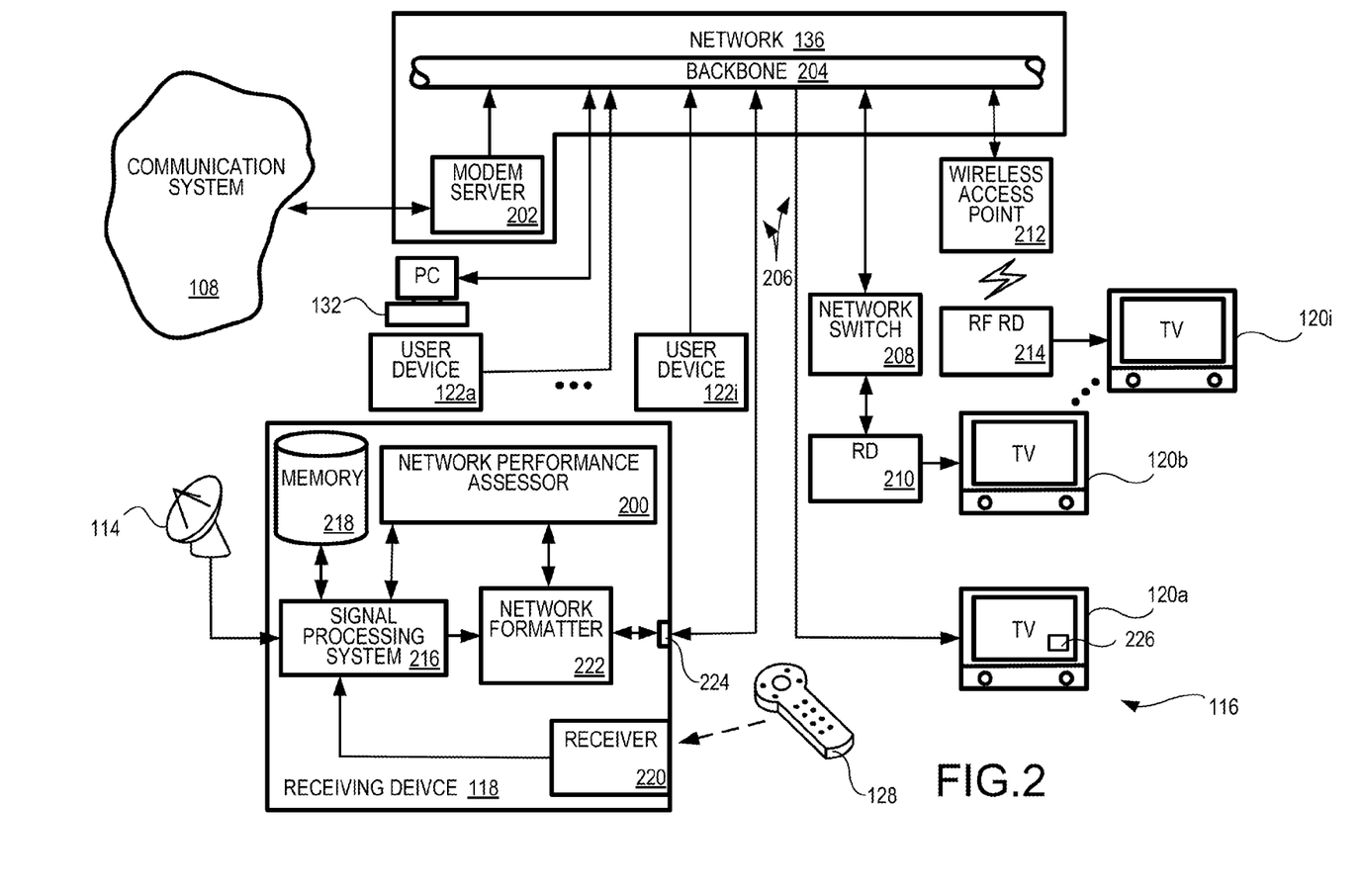
FIG. 2 is a block diagram illustrating an exemplary customer premises network in the customer premises in which embodiments of the network performance assessor may be implemented

FIG. 2 is a block diagram illustrating an exemplary network 136 residing in the customer premises 116 in which embodiments of the network performance assessor 200 may be implemented. As noted above, non-limiting examples of the network 136 may include an intranet system, a local access network (LAN) system, an Ethernet system, a cable system, a radio frequency system, a cellular system, or a hybrid system comprised of multiple types of communication media. The network 136 is any multi-point communication network operable to communicate information between devices or systems communicatively coupled to the network 136.

A plurality of presentation devices 120 and/or user devices 122 may be directly and/or indirectly coupled to the network 136. In this exemplary implementation of the network performance assessor 200, a plurality of presentation devices 120a-120i, a PC 132, and a variety of user devices 122a-122i are understood to be communicatively coupled to the receiving device 118 and the communication system 108 (FIG. 1) over the network 136. Here, information such as program content may be communicated to the plurality of presentation devices 120a-120i and user devices 122a-122i via the communication system 108, such as a satellite system. Presentation devices 120a-120i, PC 132 and/or user devices 122a-122i, may be interchangeably referred to as endpoint devices when communicatively coupled to the network 136.

The network 136 includes a modem/server 202 and a backbone 204. The server/modem 202 is an endpoint device or system operable to communicatively couple the network 136 to the communication system 108. A non-limiting example of server/modem 202 is a dial-up phone modem operable to couple the network 136 to a telephony system. Another non-limiting example is a digital subscriber loop (DSL) modem coupled to the network 136 to a DSL system. Another non-limiting example is a cable modem, fiber optic modem, or the like, operable to couple the network 136 to a cable system.

Modem/server 202 is operable to receive information communicated to it from selected endpoint devices coupled to the network 136, is operable to convert the received information into a format compatible with the communication system 108, and is operable to transmit the re-formatted information to the communication system 108. Conversely, modem/server 202 is operable to receive information communicated to it from the communication system 108, is operable to convert the received information into a format compatible with the network 136, and is operable to transmit the re-formatted information to selected endpoint devices coupled to the network 136.

The backbone 204 is referred to herein to be the physical topology of the network 136 which communicatively couples the various endpoint devices via a suitable connector or medium, generally denoted by reference numeral 206. Exemplary topologies include bus, ring, star, or switched topologies. Connectors 206 may be any physical structure or combinations thereof connecting presentation devices 118, user devices 120, and/or other endpoint devices. Examples of connectors 206 include, but are not limited to, a hard wire connection, a bus, a cable, or a fiber optics cable. Switching devices may even be used as part of the physical structure of the network 136. Further, connectors 206 may be non-physical structures, such as, but not limited to an RF media or an IR media.

A plurality of presentation devices 120a-120i, a PC 132, user devices 122a-122i, and a receiving device 118 are non-limiting illustrated examples of devices that can be communicatively coupled to the network 136. It is appreciated that it is not convenient to list or describe herein all of the possible forms of devices, systems and/or media of the network 136 and/or the communication network 102. That is, there are practically limitless combinations of devices which may be communicatively coupled directly or indirectly to the backbone 204.

Further, intermediary devices may be coupled between the backbone 204 and endpoint devices, such as, but not limited to, presentation device 120a-120i. For example, presentation device 120b is illustrated as communicatively coupled to the backbone 204 via a network switch 208 and a secondary receiving device (RD) 210. Here, it is appreciated that the format of information communicated over the network 136 to the network switch 208 is packet based with headers identifying destination endpoint devices (and/or intermediary devices). Accordingly, the network switch 208 monitors communication traffic over the network 136, and accepts information that is directed to the presentation device 120b, receiving device 210, or the network switch 208 in this example. The accepted information, depending on the format of the information and the corresponding format of the receiving device 210 and/or presentation device 120b, may be re-formatted by the network switch 208, by the receiving device 210, and/or by the presentation device 120b such that the communicated information is communicated to a viewer (viewed and listened to on the presentation device 120b).

As another example, presentation device 120i is illustrated as communicatively coupled to the backbone 204 via a wireless access point 212 and an RF receiving device (RD) 214. Here, it is appreciated that the format of information communicated over the network 136, directed to the destination presentation device 120i, is received by the wireless access point 212. The received information is converted into a wireless RF signal, communicated to the RF receiving device 214, and then is received and converted by the RF receiving device 214 into a signal that is compatible with presentation device 120i, such that the communicated information is communicated to a viewer (viewed and listened to on the presentation device 120i). RF receiving device 214 may be a single unit operable to directly receive RF signals, or may be a combination of devices acting in concert to receive RF signals.

Embodiments of receiving device 118 may include a signal processing system 216, an optional memory 218, a receiver 220, and a network formatter 222. A port 224 may be provided to physically couple the receiving device 118 to the network 136 via a suitable connector 206. Alternatively, the receiving device 118 may be communicatively coupled to the network 136 via a wireless media, such as, but not limited to, RF or infrared media.

The signal processing system 216, optional memory 218, receiver 220, and/or network formatter 222 as described herein may denote one or more components or devices operating in concert to perform a described functionality. The components may reside together as a single unit, or may be distributed through the receiving device 118 in convenient internal locations, or may even be external to the receiving device 118.

The signal processing system 216 receives information from the receiver antenna 114, which receives satellite signals from one or more satellites 112 (FIG. 1). The signal processing 216 also receives a user selection signal generated, for example, by the remote 126, via the receiver 220. A user selection signal may specify one or more channels or some other information of interest. Based upon the user selection signal, signal processing system 216 generates information (video and/or audio) corresponding to the selected channels or other selected information (e.g.; a program guide or movie selection menu). The signal processing system 216 may perform various transcode, decode, encode and other types of operations. The information is generated from the received signals and/or from information residing in memory module 218.

The generated information is communicated to the network formatter 222. Network formatter 222 converts and formats the received information into an information signal that is in a format compatible with the network 136. In some embodiments, the network formatter 222 may change selection of programming to a different format communicated to the receiving device 118. This formatted information signal is communicated over the network 136 to one or more of the presentation devices 120a-120i or other endpoint devices. Network formatter 222 may be a stand-alone device in some embodiments, or, may be integrated into or with other devices of the receiving device 118 in other embodiments. Network formatter 222 may also include other functionality not described herein.

In the exemplary system illustrated in FIG. 2, the program may be communicated over the network 136 to a first presentation device 120a. Here, if the network 136 is a packet-based communication system that may be internet protocol (IP) compatible, the presentation device 120a is an IP compatible TV with an input port operable to receive the program as IP formatted information. Thus, this presentation device 120a is a type of endpoint device since it has an address or the like identifying itself such that the program communicated to it by the receiving device 118 may identify the presentation device 120a as the destination device.

In the exemplary system illustrated in FIG. 2, the same program, or a different program, may be communicated from the receiving device 118 (additionally or alternatively) over the network 136 to a second presentation device 120b. The information may be received by presentation device 120b via intermediary devices, the network switch 208 and the receiving device 210. Similarly, the same or different program communicated from the receiving device 118 may be additionally or alternatively communicated over the network 136 to a third presentation device 120*i*. The program is received by presentation device 120*i* via intermediary devices, the wireless access point 212 and the RF set-top box 214.

Connectivity between the above-described elements of FIG. 2 are illustrated as single hard-wire connectors. Other embodiments may employ multiple hard-wire connectors, may employ optical based connectors, may employ wireless media connections, may employ a communication bus, may employ combinations of connector/connection types, or may employ proprietary or third party networks. It is appreciated that it is not practical to list or describe herein all of the possible types or forms of connectors/connections. However, all such possible connectors/connections, now known or later developed, are intended to be included within the scope of this disclosure.

C. Customer Premises Network Capacity Constraints

Some networks 136 have a fixed capacity, and other networks 136 may be expandable. However, at any given point in time, it is appreciated that the network 136 has a limited capacity to handle a maximum amount of information transfer, interchangeably referred to as communication traffic.

Peak capacity corresponds to the maximum amount of information that can be reliably transmitted by the network 136, either instantaneously or over some predefined period of time, and is interchangeably referred to herein as the "peak capacity" of the customer premise network 136. Peak capacity may be an amount of discrete program information, such as, but not limited to, digital data, communicated over a period of time in a digitally-based communication format. In other networks 136, peak capacity may be a bandwidth of an analog-based communication format.

Peak capacity of the network 136 may be predetermined or defined in a variety of manners. For example, peak capacity may be expressed in terms of the maximum amount of information, or data, that may be transmitted over a unit of time, interchangeably referred to as a maximum transfer rate. Peak capacity may be expressed as bits-per-second (bps), kilobits per second (kbps), megabits per second (mbps), or the like.

As noted above, peak capacity defines a maximum amount of communication traffic that the network 136 can accommodate without degradation of the communicated information, such a program communicated form receiving device 118 to presentation device 120. If one or more of the endpoint devices attempt to communicate information at a time when capacity of the network 136 is already fully utilized, or if the incrementally added amount of communication traffic added by the endpoint devices increases capacity utilization up to the peak capacity, various undesirable consequences may occur depending upon the nature of the network 136 and the operating endpoint devices. When endpoint devices attempt to communicate over a premises network 136 that is already fully utilized, or the incrementally added amount of communication traffic that would be added by the endpoint devices increases, capacity utilization of the network 136 increase up to the peak capacity. Accordingly, a capacity constraint condition exists over the network 136.

During a capacity constraint condition, portions of, or all of, transmitted information (data) communicated by some types of endpoint devices may be lost or dropped when the amount of the information traffic reaches the capacity of the network 136. In other situations, the speed of the communication of the information between endpoint devices over the network 136 may be slowed down or otherwise delayed. That is, transmission of information between endpoint devices may be performed over a greater period of time, and/or, communicated at a later time.

In the case of program information, any lost or dropped information (data), or delays in the speed of information communication, may result in a viewer perceiving an undesirable distortion of the displayed image and/or may result in missing portions of the displayed image during viewing of the program on their presentation device 120. It is appreciated that the various manifestations of problems encountered in a network 136 when endpoint devices attempt to communicate information in excess of peak capacity may varied and are too numerous to be described herein. However, all such manifestation of such problems encountered are intended to be included within the scope of this disclosure.

As a non-limiting illustrative example, consider a situation where some of the endpoint devices illustrated in FIG. 2 are operating, each utilizing a portion of the available capacity of the network 136. For example, the PC 132 may be in communication with a remote internet site via modem/server 202 and the communication system 108. Also, the PC 132 may be communicating information to the user device 122*a*, such as when the user device 122*a* is a printer. The communication of information by the PC 132 to the Internet and to the printer over the backbone 204 will utilize a portion of the available capacity of the network 136.

Continuing with the illustrative example, a user may then turn on presentation device 120*b* to watch a program in standard definition format. The program may be provided from either receiving device 118 or communication system 108. Accordingly, more information traffic is added onto the backbone 204. Further, the network switch 208 is transmitting information to the presentation device 120*b*, via receiving device 210.

At some point, information traffic of a plurality of currently operating endpoint devices, or information traffic from a newly-operating endpoint device, may cause the amount of, and accordingly the rate of, information transmission to reach the peak capacity of the backbone 204 of the network 136. For example, consider the situation where a viewer (not shown) turns on presentation device 120*a* to view a program in a high-definition (HD) format. Or, consider the situation where the viewer, via instructions made via the remote 126, instructs the receiving device 118 to communicate two HD program channels to presentation device 120*a* in a picture-on-picture (POP) format or a picture-in-picture (PIP) format.

In this example, assume that the information traffic over the backbone 204 of the network 136 reaches its peak capacity as a result of the above-described additional information communicated to the presentation device 120*a*. Thus, some endpoint devices may have to accept a slow down in the rate of its information communication over the network 136, or may have to re-transmit lost information (data) over the network 136 at a later time. In the case of a PC 132 communicating with an internet site, the apparent slowdown of the performance of the PC 132 may not be perceptible, or if perceptible, may still be tolerable to the user. For example, printing a document may take a bit longer than usual, or displayed pages on the PC 132 may take a bit longer to update.

However, a loss of video information and/or a slow down in the rate of video information communicated to the presentation device 120*a* and/or 120*b* may not be acceptable to the viewer watching the program on a presentation device 120. That is, the resultant image distortion of the displayed image on presentation device 120 is readily perceptible by a viewer viewing the program.

The network performance assessor 200, upon determining that the information traffic over the backbone 204 of the network 136 is at or near peak capacity, acts to modify the amount of, or rate of, information communicated over the backbone 204 of the network 136. Accordingly, the viewer of the presentation device 120 perceives display of the selected program at a sufficiently acceptable viewing quality.

Embodiments of the network performance assessor 200 may monitor and/or store performance information pertaining to a current capacity utilization of the network 136. When current capacity nears the maximum capacity, embodiments may identify or anticipate an occurrence of a capacity constraint on a portion of the customer premises network that is communicating the channel of video information to a video display device. In response, embodiments of the network performance assessor 200 modify at least an amount of video information communicated over the network 136 so that the video information is communicated over the network 136 operating at a total capacity utilization that is at least less than the peak capacity of the network 136. Other embodiments may modify the rate at which information is communicated over the network 136.

D. Network Performance Assessment System

Figure 3:
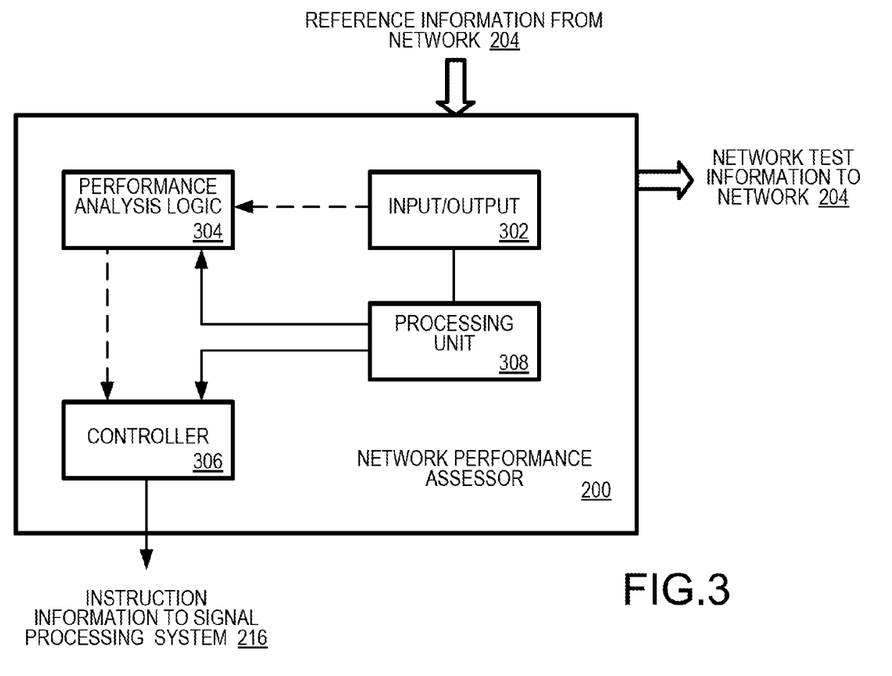
FIG. 3 is a block diagram illustrating an embodiment of a network performance assessor.

FIG. 3 is a block diagram illustrating an embodiment of a network performance assessor 200. The exemplary network performance assessor 200 includes input/output 302, performance analysis logic 304, controller 306, and optional processing unit 308. The input/output 302 is operable to receive information corresponding to the current utilization of capacity of the network 136 and/or of other devices coupled to the network 136, including paths of interest between endpoint devices or within the network 136. For example, but not limited to, performance information can be provided from a remote presentation device 120 based on the quality of the received program. The performance analysis logic 304 is executed so that the processing unit 308 may process the received performance information, described in greater detail below, from the network 136. The performance analysis logic 304 is configured to enable the processing unit 308 to analyze the received performance information to assess the current performance of the network 136 (and/or the other devices).

When performance analysis logic 304 may be implemented as software and stored in any suitable memory or data storage device, or, may be implemented as firmware or hardware or a combination thereof. It is to be appreciated that performance analysis logic 304 can be stored on any computer-readable medium for use by or in connection with any computer and/or processor related system or method. In the context of this document, the memory may be a computer-readable medium that is an electronic, magnetic, optical, or other another physical device or means that contains or stores a computer and/or processor program. Performance analysis logic 304 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with performance analysis logic 304. In the context of this specification, a "computer-readable medium" can be any means that can store, communicate, propagate, or transport the program associated with performance analysis logic 304 for use by or in connection with the instruction execution system, apparatus, and/or device. The computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic 908 is printed, as the program can be electronically captured, via for instance optical scanning of the paper or other medium, then compiled, interpreted, or otherwise processed in a suitable manner, if necessary, and then stored in the suitable memory or coded in firmware.

In situations where the network 136, and/or other devices coupled to the network 136, are operating at or near their respective peak capacities, the processing unit 308, executing the performance analysis logic 304, determines the occurrence of the capacity constraint condition and notifies the controller 306. That is, the performance analysis logic 304 enables the processing unit 308 to determine that the capacity of the network 136 is fully utilized.

A capacity constraint condition is indicative of a likelihood that information communicated to one or more presentation devices 120, such as a TV, may be subject to a delay or loss of video information such that an undesirable display of currently viewed programming is likely. In one embodiment, controller 306 generates a signal that instructs the signal processing system 216 (FIG. 2) to automatically adjust at least the video information that is being communicated to a television.

As noted above, input/output 302 is operable to receive information corresponding to the current total capacity utilization of the network 136 and/or other endpoint devices coupled to the network 136. In the exemplary system illustrated in FIG. 1, the performance information, data, or the like, is received from the network formatter 222. For example, test information may be communicated from the network formatter 222, based upon instructions or information received from the network performance assessor 200, to the other devices coupled to the network 136. In other embodiments, the performance information may be received from any suitable source, such as a special device (not shown) residing in the network 136 and/or from the endpoint devices coupled to the network 136.

Any suitable information corresponding to performance of the network 136 (such as the backbone 204), endpoint devices, and/or intermediary devices coupled to the network 136 (such as the network switch 204, receiving device 210, wireless access point, PC 132, and/or user device 122) may be provided as performance information to the input/output 302. For example, throughput between two endpoint devices under a given a specific set of conditions, such as transmission protocol (e.g.; TCP or UDP), host hardware (e.g.; processor speed, bus speed, NIC speed), operating system, system settings (e.g.; TCP buffer size, txqueuelen setting), may be used as the performance information. Other non-limiting examples of performance information may include one way delay (OWD) time taken for a packet to travel from a source, such as the network formatter 222, to a destination endpoint device, such as presentation device 120a, may be used as performance information. Alternatively, round Trip Time (RTT), the time to travel from the source to the destination endpoint device and back, may be used as performance information. The fraction of packets lost between network element A and B may be used as performance information. The loss may be measured in a one way or round trip direction. It is appreciated that many different ways to obtain performance information, and characteristics of performance information, are possible. Examples of performance information, and obtaining such performance information, are described in greater detail in "A Hierarchy of Network Performance Characteristics for Grid Applications and Services," Network Measurements Working Group, Jun. 19, 2003, which is incorporated by reference herein in its entirety. All such possible forms of performance information, now known or later developed, are intended to be included within the scope of this disclosure.

The executed performance analysis logic 304 is operable to enable the receiving device 118 to receive information corresponding to the performance information received at the input/output 302. As noted above, the performance analysis logic 304 enables the processing unit 308 to determine the occurrence of a capacity constraint on the network 136 based upon the received performance information.

In response to determining the occurrence of a capacity constraint occurring on the network 136, the processing unit 308 executing performance analysis logic 304 indicates the capacity constraint to the controller 306. In embodiments where the magnitude or seriousness of the capacity constraint is determinable, such information may also be communicated to the controller 306.

Controller 306, in response to receiving the indication of the capacity constraint (and/or receiving information indicative of the magnitude or seriousness of the capacity constraint), automatically communicates instructions to the signal processing system 216 to take a selected action. In some embodiments, the selected action adjusts the transmission of at least video information to one or more operating presentation devices 120 such that utilized capacity over the network 136 is reduced to below the peak capacity of the network 136. Accordingly, the program signal (at least the video information) communicated from the receiving device 118 (FIG. 2) is communicated to an operating presentation device 120 at a rate that is not subject to loss or delay.

The above-described input/output 302, performance analysis logic 304, processing unit 308, and controller 306 are generally described in terms of functionality. It is appreciated that the actual implementation of modules 302, 306, and logic 304, may be readily made using known components, devices, and/or systems. For example, the input/output 302, performance analysis logic 304, processing unit 308, and controller 306, may be implemented as firmware, or a combination of hardware and firmware. When implemented as hardware, the input/output 302, performance analysis logic 304, processing unit 308, and controller 306, may be constructed with commonly available components well known in the art. For example, but not limited to, a state machine (not shown) may be used and implemented as a suitable configuration of transistors on an integrated circuit (IC) chip. Alternatively, the functionality of input/output 302, performance analysis logic 304, processing unit 308, and controller 306 may be implemented as software executable by a processing system or the like.

E. Adjusting the Communicated Program Signal

As noted above, some embodiments of the network performance module 200 (FIGS. 2 and 3) cause the receiving device 118 to automatically take a selected action, such as reducing an amount of at least video information to one or more operating TVs, thereby modifying total capacity utilization over the network 136. Accordingly, the program signal (at least the video information) communicated from the receiving device 118 is communicated at a rate that is not subject to loss and/or delay.

In one embodiment, format of a communicated program is changed from an HD format to a standard definition format. A program in HD format utilizes a relatively large amount of capacity of the network 136. A program in standard definition format utilizes a relatively smaller of capacity of the network 136. Since a program presented in a standard definition format provides an acceptable quality image when displayed on a presentation device 120, it is assumed that it will be preferred by the user to receive the selected program of interest presented in the standard definition format (rather that presented in an otherwise distorted HD format).

In some embodiments, the receiving device 118 is operable to display the same or multiple HD channels to multiple presentation devices 120, or to display multiple HD channels to a single presentation device 120. In response to the occurrence of a capacity constraint in the network 136, the receiving device 118 may selectively switch one or more of the HD channels to the standard definition format. If a single presentation device 120 is initially receiving two HD channels displayed in POP or PIP mode, the receiving device 118 may selectively switch one or more of the HD channels to the standard definition format, or terminate display of one of the channels. In another embodiment, if multiple presentation devices 120 are receiving different program channels (where each communicated program channel utilizes a portion of the available capacity of the network 136), one of the program channels may be selected and communicated to the multiple presentation devices 120 (such that only the communicated program channel utilizes a portion of the available capacity of the network 136).

In other embodiments, the communicated program channel may be selectively modified such that the program channel is communicated to the presentation device 120 in a format and/or resolution that requires less capacity. Many different formats and/or resolutions of video information of a program are available to communicate over the network 136. For example, if the program channel is initially communicated in an MPEG-2 (Moving Pictures Expert Group) format, the format may be changed to an MPEG-4 format in response to the occurrence of a capacity constraint in the network 136. It is appreciated that it is not practical to list or describe herein all of the possible formats and/or resolutions used in communicating video information. However, all such possible formats and/or resolutions are intended to be included within the scope of this disclosure.

Some embodiments may be operably to adjust the rate of communication of frames to the presentation device 120, particularly if the presentation device has a buffer, memory device, or the like, operable to temporarily store portions of the received program as they are communicated to it over the network 136. That is, receiving device 118 may decrease the rate at which the program is communicated to the presentation device 120 so long as the portion of previously received program is buffered and can be used to maintain the continuity of the presentation of the program on the presentation device 120.

Various operator selectable functions are known for controlling view of a selected program. These user selectable features, commonly known as "trick" modes or functions, include, but are not limited to, fast forward, slow motion, reverse motion, stop motion, or the like. Providing such trick modes or features uses capacity of the network 136. Disabling these "trick" modes or functions results in a reduced utilization of capacity in response to the occurrence of a capacity constraint in the network 136.

The manner in which the programming channel is communicated to the presentation device 120 may also be modified. For example, programming may be provided as video transfer only (no streaming), streaming only, or streaming and transfer. Upon occurrence of the capacity constraint on network 136, these functions may be altered to a function that requires less capacity in response to the occurrence of a capacity constraint in the network 136.

Supplemental services may be provided by the receiving device 118, such as, but not limited to, Internet services and/or voice services (phone service provided under a Voice Over Internet Protocol, or VoIP). These supplemental services may be altered to a function or format that requires less capacity, or may even be terminated, to modify (increase or reduce) capacity utilization over the network 136 in response to the occurrence of a capacity constraint in the network 136.

Figure 4:
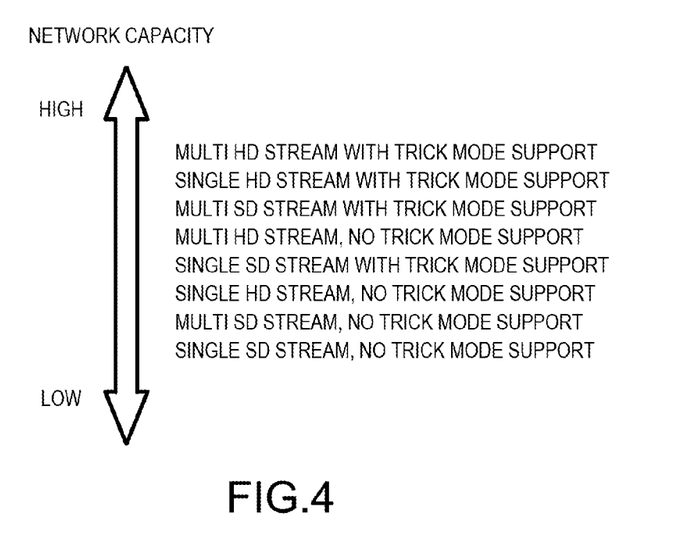
FIG. 4 is a graphical representation of relative capacity utilization required by various video formats

Some embodiments may be operable to modify, and thus format, the amount of video information communicated from the set-top box 116 in a tiered fashion. Further, selection of the adjustment may be based upon the nature or magnitude of the determined capacity constraint. For example, FIG. 4 is a graphical representation of relative capacity utilization required by various video formats. It is apparent that a single program communicated as a single standard definition (SD) stream with no trick mode support requires the least amount of utilized capacity on the network 136. On the other hand, multiple programs communicated as a multiple high definition (HD) streams with trick mode support requires a much greater amount of utilized capacity on the network 136. It is appreciated that the illustrated order of the program modes illustrated in FIG. 4 is exemplary, and actual capacity utilization requirements of the various program modes may vary depending upon the actual technologies applied in the system.

In embodiments operable to modify a program format, or change programs transmitted from the set-top box 116, in a tiered fashion, the controller 306 may assess the initial nature of the program communicated from the receiving device 118 to the presentation devices 120a-120i. The controller 306 may then determine an amount of required capacity utilization modification necessary to reduce total capacity utilization over the network 136. Next, the controller 306 may determine an adjustment to the nature of the program communicated to from the receiving device 118 to the presentation devices 120a-120i that is sufficient to modify the communicated program so that the level, amount, or rate of communicated data over network 136 is changed to a level, amount, or rate that reduces total capacity utilization over the network 136. The modification may further be based upon a threshold or other predefined amount of capacity utilization over the network 136 known to provide adequate capacity for communication of programming from the receiving device 118. In some embodiments, peak capacity of the network 136 may be defined by a threshold capacity or other predefined capacity.

Further, the adjustments may be made in a tiered fashion among a plurality of operating presentation devices 120. For example, content communicated to a primary designated presentation device 120 may remain unchanged, while the program communicated to another presentation device 120 may be modified to reduce capacity utilization over the network 136. Programming may even be halted to the other presentation device 120.

In some embodiments where adjustments are made in a tiered fashion, a priority system may be used to prioritize selection of the actions taken in response to an occurrence of a constraint. That is, some embodiments of the network performance assessor 200 may prioritize selection of program formats to implement a capacity utilization modification (increase or reduction) over the network 136.

In some embodiments, a connection port or the like is available that may be communicatively coupled to other endpoint devices coupled to the network 136. Thus, some embodiments of the network performance assessor 200 may issue control signals to the other endpoint devices, or intermediary devices, to change operation of the endpoint devices, thereby modifying capacity utilization over the network 136. For example, if communicatively coupled to a printer, the network performance assessor 200 may slow down, postpone, or even halt printing operations to increase capacity for communication of programming from the receiving device 118. If communicatively coupled to PC 132, the network performance assessor 200 may slow down or even halt communications with the Internet to increase capacity for communication of programming from the receiving device 118. If communicatively coupled to the wireless access point 212, the communication characteristics of the wireless signal may be modified, or even halted, to increase capacity for communication of programming from the receiving device 118.

F. Other Embodiments

Figure 5:
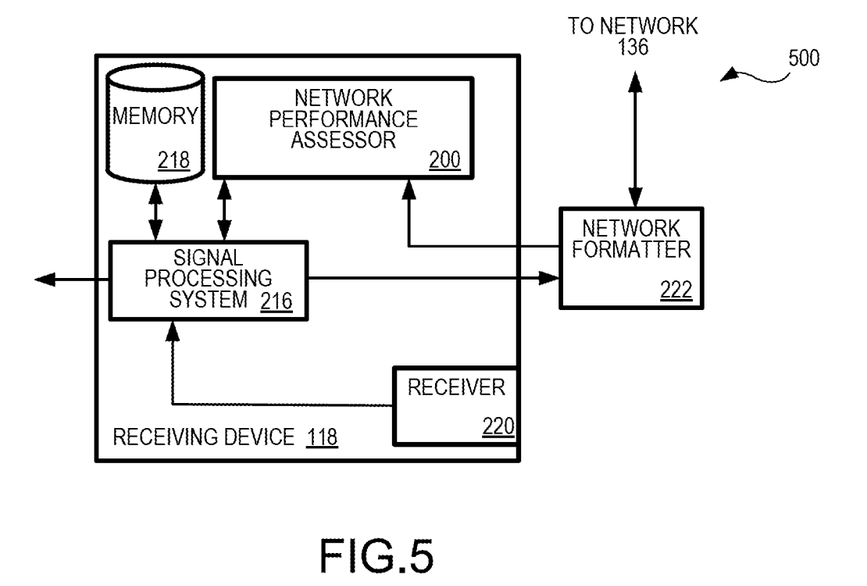
FIG. 5 is a block diagram illustrating an embodiment of a network performance assessor.

FIG. 5 is a block diagram illustrating an embodiment of a network Performance Assessment System 500. In this Embodiment, the Network Formatter 222 is a separate device residing outside of the receiving device 118. Thus, network formatter 222 is configured to communicate over the network 136 that it is coupled to. This embodiment may be configured to communicatively couple the receiving device 118 to any type of network 136 through the configured network formatter 222.

Figure 6:
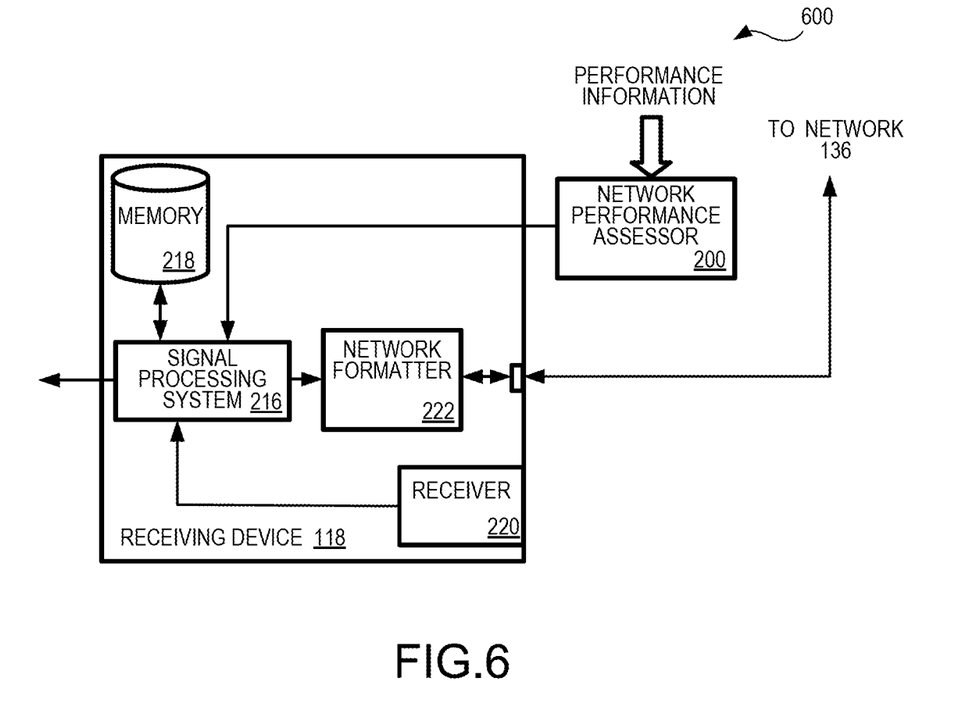
FIG. 6 is a block diagram illustrating an embodiment of a network performance assessor.

FIG. 6 is a block diagram illustrating an embodiment of a network performance assessment system 600. In this embodiment, the network performance assessor 200 is a separate device residing outside of the receiving device 118. Thus, receiving device 118 may communicatively coupled to the network performance assessor 200, where the network performance assessor 200 is operable to communicate over the particular type of network 136 that it is coupled to. The network performance assessor 200 may be configured to receive performance information independently from the particular configuration of the receiving device 118.

Receiving device 118 was described and illustrated as receiving program content via receiver antenna 114 receiving signals from satellite 110 (FIG. 1). Other embodiments may receive program content from any suitable sources and/or media. Such sources and media may include cable or fiber optic networks, ATM networks, or DSL systems. Wireless networks such as RF or microwave may also provide programs to the receiving device 118.

Embodiments may periodically monitor capacity utilization of the network 136, or monitor on a real-time basis. The above-described embodiments are responsive to occurrence of instances where total capacity utilization of the network 136 reaches its peak capacity.

Embodiments may act in response to instances where total capacity utilization of the network 136 reaches a predefined or threshold capacity (that has been defined as the peak capacity). For example, a threshold capacity of 80% of the maximum peak capacity of the network 136 may be predefined as the peak capacity. It may be further known that an initiation of a communication of a single HD format program channel to a presentation device 120 may utilize 25% of the available capacity of the network 136. Accordingly, if the set-top box communicated the HD format program to the presentation device 120, capacity utilization of the network 136 will reach its peak capacity (defined as the predefined or threshold capacity).

In the above-described situation, the network performance assessor 200 would act in a proactive manner to maintain capacity utilization of the network 136 at or below its peak capacity. Various actions are possible. For example, the selected program may be provided in a standard definition format. The format of the data may be changed (e.g.; from MPEG-4 to MPEG-2). Or another endpoint device may be affected (e.g.; ceasing connectivity of a PC to the Internet or stopping/delaying a print job sent to a printer). Any possible action described herein, or combination of actions, may be effected in a pro-active manner to maintain capacity utilization of the network 136 at or below its peak capacity. Thus, a viewer would not have to view a distorted image on the presentation device 120 while waiting for the network performance assessor 200 to perform a correction.

Embodiments may interactively or dynamically adjust the amount of information communicated over the network 136. For example, but not limited to, the format and/or resolution of the video information may be changed on a real time, near real time, or periodic basis to adjust the amount of information communicated over the network 136. Changes may be made on a discrete basis (changing between MPEG-2 and MPEG-4 formats, etc.), or may be made on a scaling basis (change the resolution of the image, change the size of the image, etc.).

Audio information may also be modified. For example, but not limited to, multiple channel audio of a surround sound format may be modified into a stereo channel or even a mono channel audio format. Such changes to the characteristics of the audio information may not be readily perceptible to the viewer.

Further, embodiments may act in response a total capacity utilization of the network 136 reaching peak capacity based upon a predefined or threshold capacity, and accordingly, provide a margin of error or the like. That is, the predefined or threshold capacity may provide a sufficient amount of margin to accommodate short term fluctuations in capacity utilization caused by the operating endpoint devices. For example, communication of data from a PC to a remote memory, via the network 136, may use capacity from time-to-time on the network 136. This fluctuating capacity utilization may, if the network 136 is operating at or near its peak capacity, cause the above-described problems in the transmission of programming content form the receiving device 118 to the presentation device 120. Thus, the network performance assessor 200 may act to keep total capacity utilization of the network performance assessor 200 at or below the predefined or threshold capacity during such short term fluctuations in capacity utilization.

In various embodiments, the predefined or threshold capacity may be a variable parameter. That is, the amount of capacity difference between the predefined or threshold capacity and the network 136 may vary. For instance, capacity difference between the predefined or threshold capacity and the peak capacity of the network 136 may be such that there is sufficient reserve capacity to accommodate communication of two HD program channels to at least one presentation device 120. If only one HD channel is currently being communicated to a presentation device 120, the predefined or threshold capacity may be changed to reflect a currently available amount of available capacity.

Memory module 218 may have sufficient memory capacity for information storage. The network performance assessor 200 may save or store information pertaining to the received performance information and/or pertaining to the actions taken to modify (increase or reduce) capacity utilization. This information may be later retrieved for analysis and/or reporting. This information may be very desirable when assessing current and future capacity requirements of the network 136 (or selected component therein). In some situations, the owner of the network 136 may elect to upgrade their facilities or purchase premium or valued added services after analyzing the saved performance information and/or the actions taken to modify (increase or reduce) capacity utilization.

Embodiments may be operable to communicate the detection of the occurrence of a capacity constraint to a user so that the user understands the reason for the perceptible distortion in their viewed image. The user may further be shown a menu 226 (FIG. 2) or the like with selectable options available for modifying capacity utilization on the network 136. The network performance assessor 200 may be configured to change program formats from HD to standard definition, change an MPEG-4 to an MPEG-2 or MPEG-1 format, eliminate trick modes or features, or even change operation of other endpoint devices to implement a capacity utilization modification. Menu 226 or the like may be displayed to the user such that the user is able to interactively select a preferred action that the network performance assessor 200 will take to modify capacity utilization on the network 136.

Embodiments may be operable to take actions to increase the capacity utilization of the network 136 as additional capacity becomes available on the network 136. For example, the network performance assessor 200 may change the program from a standard definition program format to an HD program format, may change the program received standard definition program format to corresponding program received in a HD program format, add trick modes or features, or even change operation of other endpoint devices to implement a capacity utilization increase. A menu or the like may be displayed to the user such that the user is able to select a preferred action that the network performance assessor 200 will initiate to increase capacity utilization on the network 136.

Embodiments of receiving device 118 may reside in, be integrated with, or other wise be included in or with a presentation device 120. Such hybrid systems may be coupled to the network 136 such that programs may be communicated to other remote presentation devices 120 via the network 136.

Embodiments of presentation devices 120, user devices 122, modem server 202, or other remote devices coupled to network 136 may have a network performance assessor 200 implemented therein such that network capacity utilization may be monitored and such that instructions can be provided to the receiving device 118 so that programs are modified to increase or decrease capacity utilization on the network 136. For example, but not limited to, a modem server 202 embodiment may monitor traffic over its respective network 136, and if the maximum amount of information traffic that may be simultaneously transmitted over the network 136 is reached, or substantially reached, the modem server 202 may communicate instructions to receiving device 118 so as to modify the program communicated over the network 136 to reduce capacity utilization on the network 136. The instructions may take any of a variety of forms. An amount of capacity reduction/increase, type of program change, or the like could be specified to the receiving device 118. Or, the receiving device 118 may itself, in response to receiving a request or the like, select the appropriate action to decrease or increase capacity utilization on the network 136 in response to receiving an instruction or the like from the presentation devices 120, user devices 122, modem server 202, or other remote devices.

Programs may be configured to facilitate the adjustment of capacity utilization over the network 136. For example, an advertising program or a movie may be generated in a first format that utilizes a first amount of capacity, and generated in a second format that utilizes a lesser amount of capacity. Accordingly, embodiments may select which program format is communicated to the presentation device 120 based upon the current traffic over the network 136.

Embodiments of the receiving device 118 may be communicating the program to a presentation device 120 having a buffer, memory or the like such that received programming is temporarily stored, processed, and then presented on the presentation device 120. In the event of a capacity constraint, the embodiment may decrease the rate at which frames of video information of the program are communicated to the presentation device 120, which simply decreases the amount of the program that is buffered or stored prior to presentation.

Figure 7:
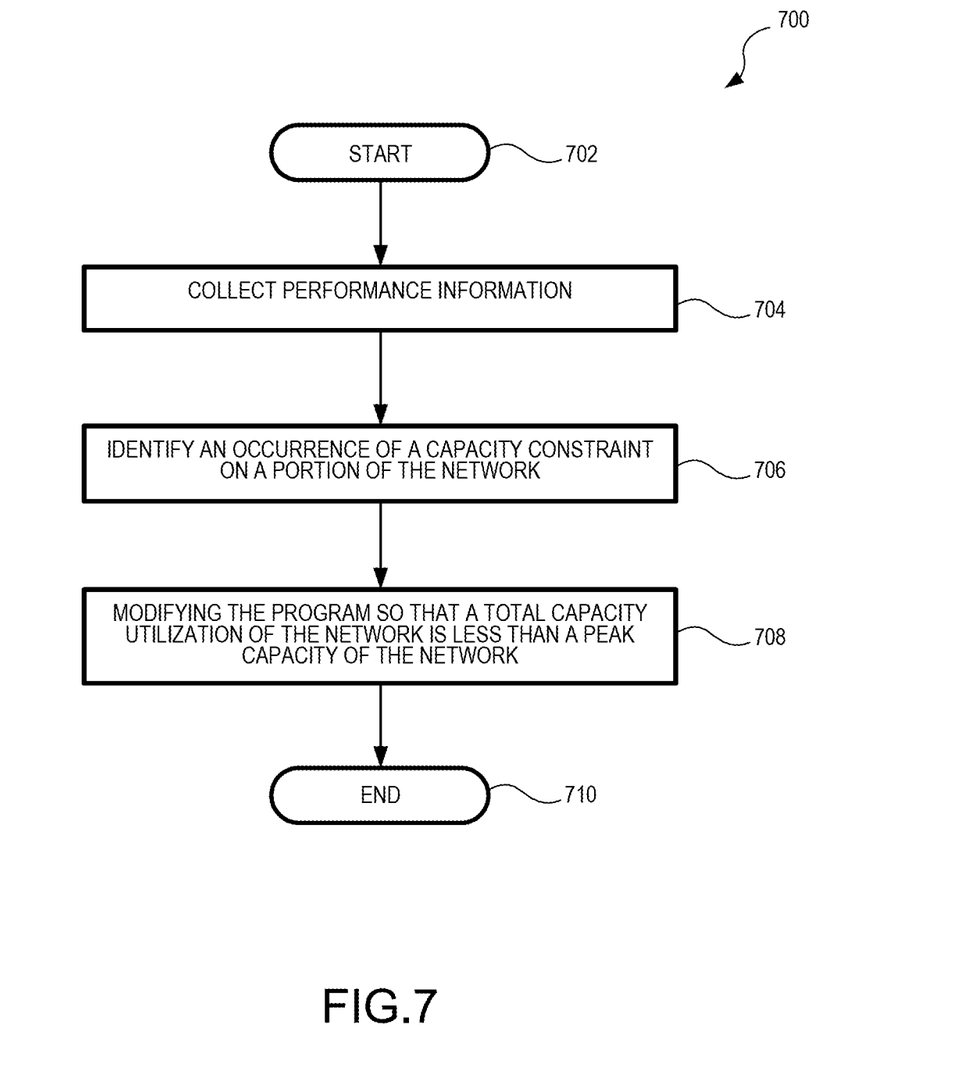
FIG. 7 is a flowchart illustrating a process used by an exemplary embodiment of the network performance assessor.
Figure 8:
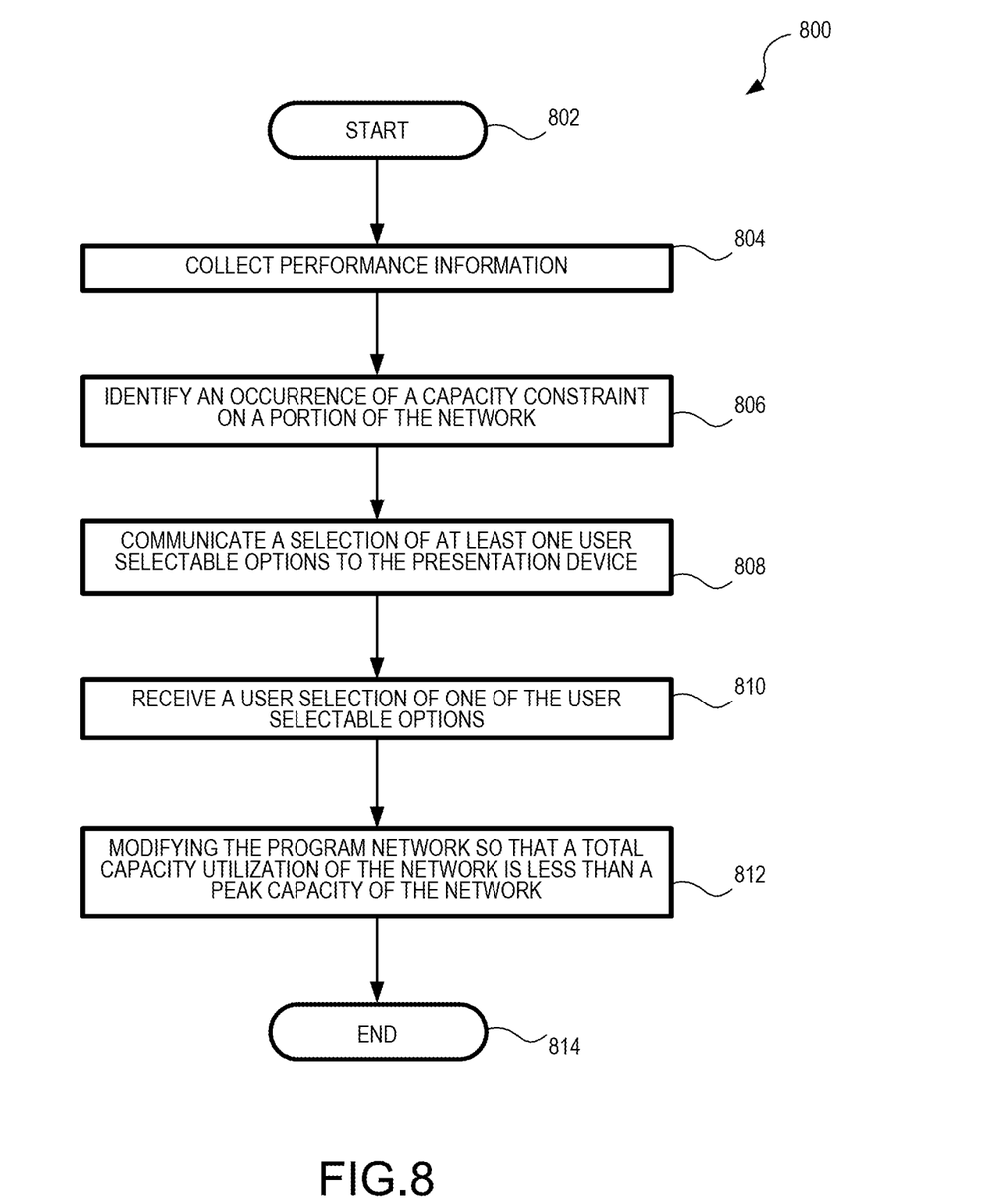
FIG. 8 is a flowchart illustrating an alternative process used by an exemplary embodiment of the network performance assessor that is responsive to a user selection.

FIGS. 7 and 8 are a flowcharts 700 and 800, respectively, illustrating processes used by an embodiment of a network performance assessor 200 (FIG. 2). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 7, the process 700 is ongoing with operation of the receiving device 118 (FIG. 1), and is illustrated as starting at 702. At 704, performance information is collected pertaining to a current capacity utilization of a network. At 706, an occurrence of a capacity constraint is identified on a portion of the network that is communicating the program to a presentation device. At 708, the program is modified so that a total capacity utilization of the network is less than a peak capacity of the network. The process ends at 710.

With respect to FIG. 8, the process 800 is ongoing with operation of the receiving device 118 (FIG. 1), and is illustrated as starting at 802. At 804, performance information is collected pertaining to a current capacity utilization of the network. At 806, an occurrence of a capacity constraint is identified on a portion of the network that is communicating the program to a presentation device. At 808, a selection of at least one user selectable option is communicated to the display, each user selectable option corresponding to a different manner of adjusting the communication of the program. At 810, a user selection of one of the user selectable options is received. At 812, the program is modified so that a total capacity utilization of the network is less than a peak capacity of the network. The process ends at 814.

It is to be appreciated that the network 136 may be implemented in a variety of manners. For example, but not limited to, the network 136 may be implemented by communicatively coupling the receiving device 118 and the network performance assessor 200 to the network 136. As described hereinabove, the network performance assessor 200 is operable to assess performance of the network 136, operable to determine an occurrence of a capacity constraint on the network 136, and operable to cause the receiving device 118 to modify the program communicated over the network 136 to reduce capacity utilization on the network 136. As described hereinabove, the receiving device 118 and the network performance assessor 200 may be implemented as a single device or separately implemented. If separately implemented, the receiving device 118 and the network performance assessor 200 may be coupled to the network at different locations.

While various embodiments have been described hereinabove, it is to be appreciated that various changes in form and detail may be made without departing from the spirit and scope of the invention(s) presently or hereafter claimed.

The invention claimed is:

1. A method to deliver real-time programming over a network, comprising:
    collecting, with a processor, performance information pertaining to a current capacity utilization of the network and a peak capacity utilization of the network, the current capacity utilization of the network being a summation of a bandwidth of each data stream of a plurality of data streams respectively allocated to the network, the peak capacity utilization of the network being a total bandwidth of the network available for allocation to the plurality of data streams;
    assigning a priority to each data stream that contributes to the current capacity utilization of the network wherein a highest priority is assigned to a data stream of real-time programming;
    comparing the current capacity utilization with a threshold bandwidth, the threshold bandwidth being less than or equal to eighty percent of the peak capacity of the network;
    identifying an occurrence of a bandwidth request above the threshold bandwidth;
    selecting at least one of the plurality of data streams based on the assigned priority;
    performing, in response to the occurrence of the bandwidth request above the threshold bandwidth, a dynamic conversion of the selected one of the plurality of data streams from a higher bandwidth video encoding protocol to a lower bandwidth video encoding protocol, the dynamic conversion reducing an amount of bandwidth allocated to the selected one of the plurality of data streams thereby reducing the current capacity utilization below the threshold bandwidth;
    passing the data stream of real-time programming on the network; and
    performing a dynamic reversion of the selected one of the plurality of data streams from the lower bandwidth video encoding protocol back to the higher bandwidth video encoding protocol when the current capacity utilization of the network will remain less than the threshold bandwidth after performing the dynamic reversion.

2. The method of claim 1 wherein the data stream of real-time programming includes a nationally televised program.

3. The method of claim 1 wherein reducing the amount of bandwidth allocated to the selected one of the plurality of data streams includes disabling trick mode functionality provided by a receiving device that is communicating the selected one of the plurality of data streams to a presentation device, the trick mode functionality including at least one of fast forward, slow motion, and pause.

4. The method of claim 1, comprising:
    re-enabling the disabled trick mode functionality when the current capacity utilization of the network will remain less than the threshold bandwidth after the re-enabling.

5. The method of claim 1 wherein the higher bandwidth video encoding protocol is a high definition (HD) video encoding protocol and the lower bandwidth video encoding protocol is a standard definition (SD) video encoding protocol.

6. The method of claim 5 wherein the higher and lower bandwidth video encoding protocols conform to at least one Moving Pictures Expert Group (MPEG) video encoding protocol.

7. The method of claim 1, comprising:
    denying a request to pass at least one data stream of the plurality of data streams on the network, the at least one data stream having a lower assigned priority than the data-stream of real-time programming, the denial based on the current capacity utilization of the network and a requested bandwidth of the at least one data stream.

8. The method of claim 1 wherein reducing the amount of bandwidth allocated to the selected one of the plurality of data streams comprises:
transmitting a query to at least one endpoint device coupled to receive the selected one of the plurality of data streams, the query requesting specification of a capacity utilization of the endpoint device;
receiving the specification of the capacity utilization from the endpoint device; and
reducing capacity utilization of the endpoint device based on the received specification.

9. A system to communicate a real-time program over a network, comprising:
a network performance assessor to:
collect performance information pertaining to a current capacity utilization of the network and a peak capacity utilization of the network,
compare the current capacity utilization with a threshold related to the peak capacity utilization,
identify an occurrence of a bandwidth request that if granted would raise the current capacity utilization above the threshold, and
assign a priority to each data stream of a plurality of data streams that contribute to the current capacity utilization of the network wherein a highest priority is assigned to a data stream of real-time programming;
a processor module having logic to select one of the plurality of data streams, the selected one of the plurality of data streams having a lower assigned priority than the real-time programming data stream; and
a program formatter to dynamically modify, in response to the occurrence of the bandwidth request that if granted would raise the current capacity utilization above the threshold, a scaling basis characteristic of the selected one of the plurality of data streams to permit the current capacity utilization of the network to be equal or below the threshold, the scaling characteristic arranged to direct a conversion of the selected one of the plurality of data streams from a higher bandwidth video encoding protocol to a lower bandwidth video encoding protocol, the program formatter to further dynamically modify the scaling basis characteristic to direct a reversion of the selected one of the plurality of data streams from the lower bandwidth video encoding protocol back to the higher bandwidth video encoding protocol when the current capacity utilization of the network will remain less than the threshold bandwidth after performing, the dynamic reversion.

10. The system of claim 9 wherein assigning a priority to each data stream includes assigning priority chosen from a plurality of tiers of priority wherein a plurality of data streams share a same priority.

11. The system of claim 10 wherein assigning a priority to each data stream includes assigning the highest priority only to real-time programming data streams.

12. The system of claim 9 wherein modifying the selected one of the plurality of data streams includes disabling trick mode functionality provided by a receiving device that is communicating the selected one of the plurality of data streams to a presentation device, the trick mode functionality including at least one of fast forward, slow motion, and pause.

13. An apparatus to communicate programs over networks, comprising:
a receiver to receive a user selection of a real-time program;
a network formatter operable to:
format the selected real-time program into information compatible with a communication format used by a network, and
transmit the formatted real-time program onto the network; and
a network performance assessor operable to:
receive performance information corresponding to a current capacity utilization of the network,
assess performance of the network by comparing the current capacity utilization with a threshold related to a peak capacity utilization of the network,
determine an occurrence of a bandwidth constraint in response to the current capacity utilization comparison, and
assign a priority to each data stream of a plurality of data streams that contribute to the current capacity utilization of the network wherein a highest priority is assigned to the selected real-time program; and
a processor unit operable to select one of the plurality of data streams, the selected one of the plurality of data streams having a lower assigned priority than the selected real-time program; and
the network formatter further operable to:
dynamically modify the selected one of the plurality of data streams to remove the occurrence of the bandwidth constraint, the dynamic modification including a conversion of the selected one of the plurality of data streams from a higher bandwidth video encoding protocol to a lower bandwidth video encoding protocol, and
further dynamically modify the selected one of the plurality of data streams with a reversion of from the lower bandwidth video encoding protocol back to the higher bandwidth video encoding protocol when the current capacity utilization of the network will remain less than the threshold bandwidth after performing the dynamic reversion.

14. The apparatus of claim 13 wherein the real-time program includes a nationally televised program.

15. The apparatus of claim 13 wherein assigning a priority to each data stream includes assigning a priority chosen from a plurality of tiers of priority, the highest priority tier being assigned only to real-time programming data streams.

16. The apparatus of claim 13 wherein modifying the selected one of the plurality of data streams includes denying a request to transmit the selected one of the plurality of data streams.

17. The apparatus of claim 16 wherein denying the request to transmit the selected one of the plurality of data streams includes denying data transmission to a non-audio and non-video endpoint device.

* * * * *